US011799277B2

(12) United States Patent
Steeger et al.

(10) Patent No.: US 11,799,277 B2
(45) Date of Patent: Oct. 24, 2023

(54) FASTENING PART

(71) Applicant: IGUS GMBH, Cologne (DE)

(72) Inventors: Ralf Steeger, Lohmar (DE); Joerg Ottersbach, Bornheim (DE)

(73) Assignee: IGUS GMBH, Cologne (DE)

( * ) Notice: Subject to any disclaimer, the term of this patent is extended or adjusted under 35 U.S.C. 154(b) by 77 days.

(21) Appl. No.: 17/594,018

(22) PCT Filed: Mar. 30, 2020

(86) PCT No.: PCT/EP2020/058896
§ 371 (c)(1),
(2) Date: Sep. 30, 2021

(87) PCT Pub. No.: WO2020/201181
PCT Pub. Date: Oct. 8, 2020

(65) Prior Publication Data
US 2022/0166202 A1 May 26, 2022

(30) Foreign Application Priority Data
Apr. 1, 2019 (DE) ............ 20 2019 101 830.5

(51) Int. Cl.
*H02G 3/32* (2006.01)
*B25J 19/00* (2006.01)
(Continued)

(52) U.S. Cl.
CPC ............ *H02G 3/32* (2013.01); *B25J 19/0025* (2013.01); *F16B 2/08* (2013.01); *F16L 3/00* (2013.01); *F16L 3/237* (2013.01); *F16L 33/02* (2013.01)

(58) Field of Classification Search
CPC ... F16L 3/327; F16L 33/02; F16L 3/00; F16B 2/08; B25J 19/0025; H02G 3/32
See application file for complete search history.

(56) References Cited

U.S. PATENT DOCUMENTS 3,539,138 A   11/1970  Desroches
4,460,142 A *  7/1984  O'Rorke ............ G09F 7/18
                                              248/230.8
(Continued)

FOREIGN PATENT DOCUMENTS

CA   2429053      11/2004
CN   203666541    6/2014
(Continued)

OTHER PUBLICATIONS

International Search Report from corresponding PCT Appln. No. PCT/EP2020/058896, dated May 12, 2020.
(Continued)

*Primary Examiner* — Tan Le
(74) *Attorney, Agent, or Firm* — Grossman, Tucker, Perreault & Pfleger, PLLC

(57) ABSTRACT

A fastening part for fastening a cable carrier to a component, said fastening part comprising: a foot web which can be arranged on a component so as to extend in the peripheral direction thereof and has holding means in its end regions for a first fastening element for fastening the fastening part to the component; and a fastening web which extends in the direction of the foot web and which has multiple fastening means for fastening a differently designed second fastening element for fastening a cable carrier to the fastening part; wherein the foot web and the fastening web are connected to one another in their central region via a connecting element, and side regions of the fastening web extending beyond the connecting element have at least some of the fastening means as first fastening means.

17 Claims, 2 Drawing Sheets

(51) Int. Cl.
- *F16L 3/237* (2006.01)
- *H02G 3/04* (2006.01)
- *F16L 33/02* (2006.01)
- *F16B 2/08* (2006.01)
- *F16L 3/00* (2006.01)

(56) References Cited

U.S. PATENT DOCUMENTS

| | | | |
|---|---|---|---|
| 4,659,046 A * | 4/1987 | Parduhn | F21V 21/108 |
| | | | 248/214 |
| 7,997,546 B1 | 8/2011 | Andersen et al. | |
| 9,200,654 B1 * | 12/2015 | Parduhn | F16B 2/08 |
| 2005/0028326 A1 | 2/2005 | Logan | |
| 2016/0009469 A1 | 1/2016 | Schneider De Oliveira et al. | |
| 2020/0055201 A1 | 2/2020 | Joesten | |

FOREIGN PATENT DOCUMENTS

| | | |
|---|---|---|
| CN | 207333965 | 5/2018 |
| DE | 102011116948 | 4/2013 |
| DE | 102017117087 | 1/2019 |
| EP | 2251553 | 11/2010 |
| JP | 2002373536 | 12/2002 |
| WO | 2017/220976 | 12/2017 |
| WO | 2018/177482 | 10/2018 |

OTHER PUBLICATIONS

International Preliminary Report on Patentability from corresponding PCT Appln. No PCT/EP2020/058896, dated Mar. 30, 2020.
Office Action from related Chinese Appln. No. 202080026668.7, dated Feb. 11, 2023.

* cited by examiner

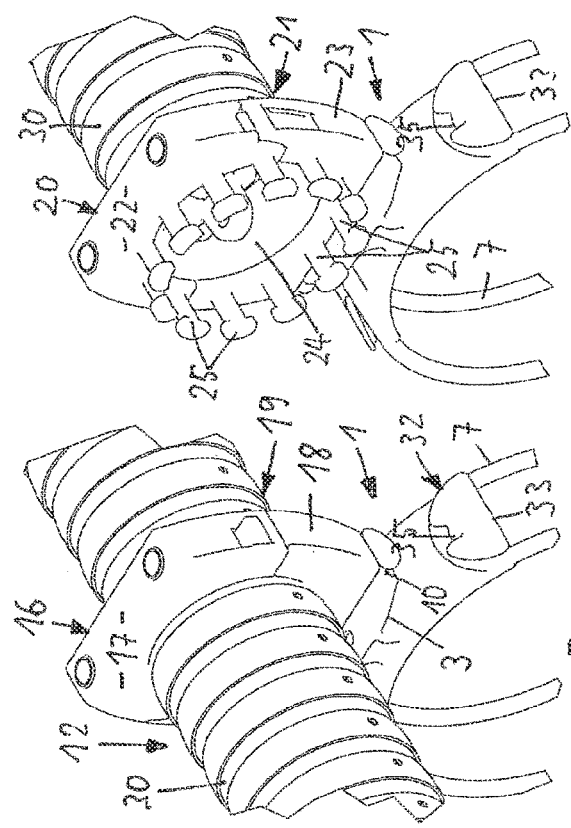
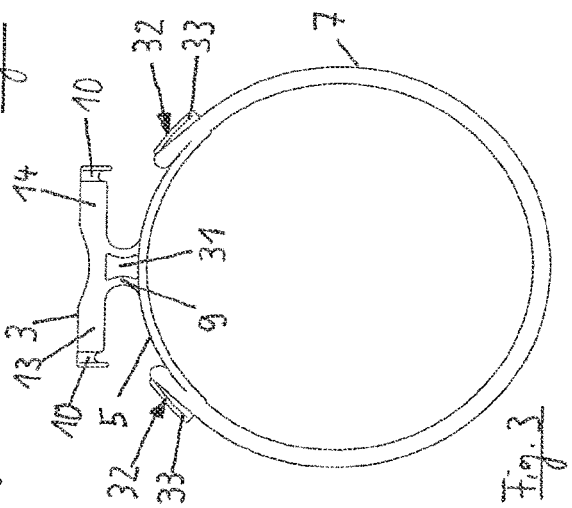
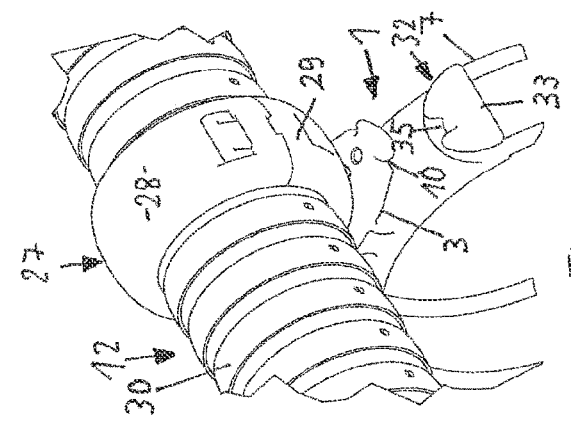
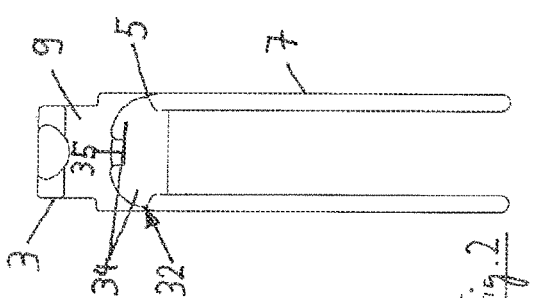
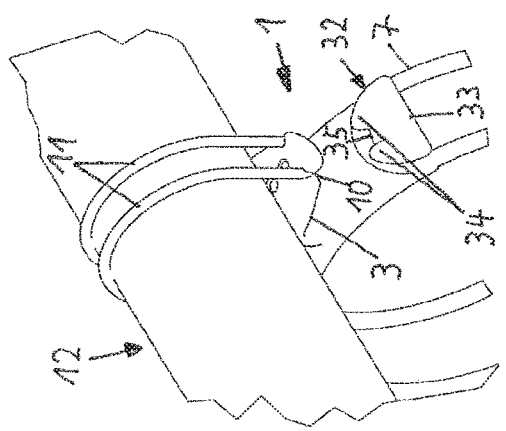
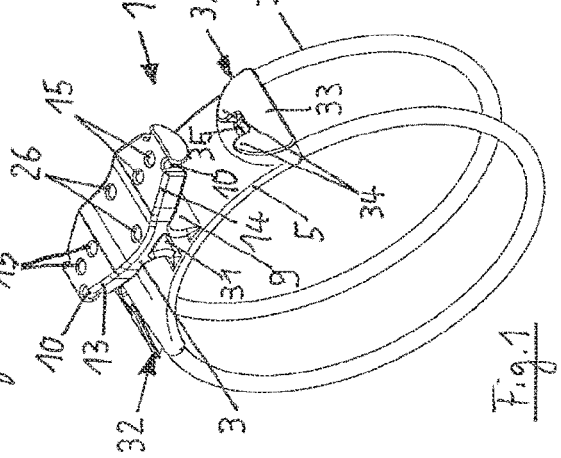

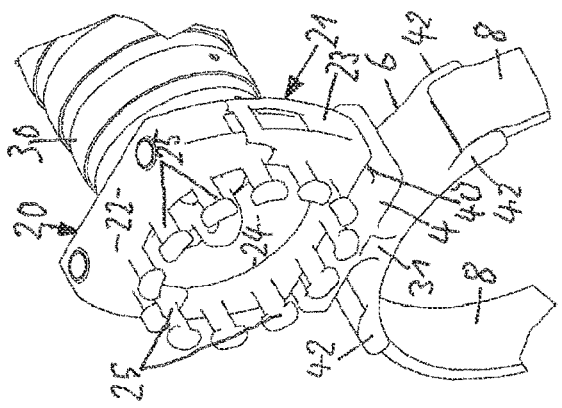
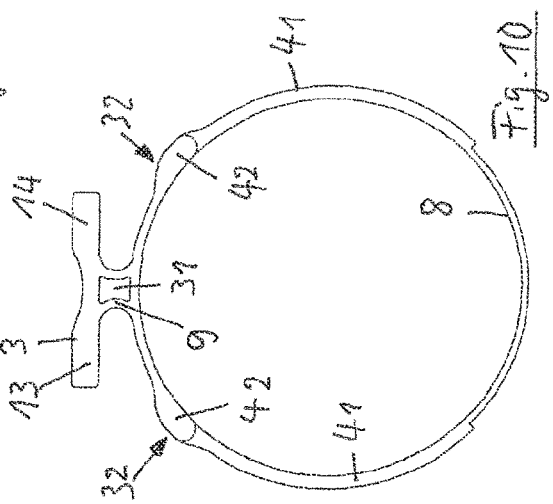
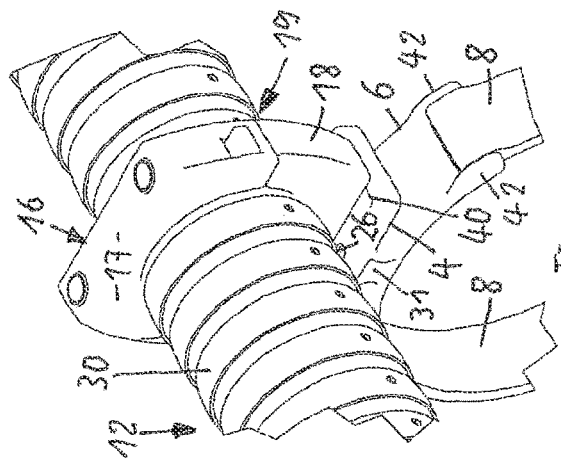
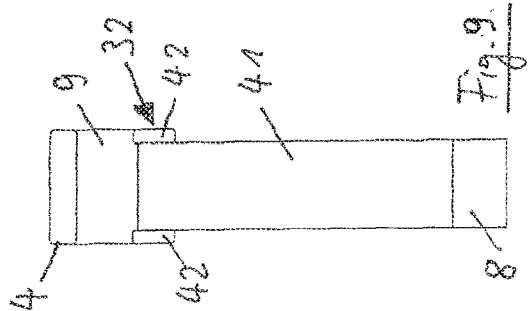
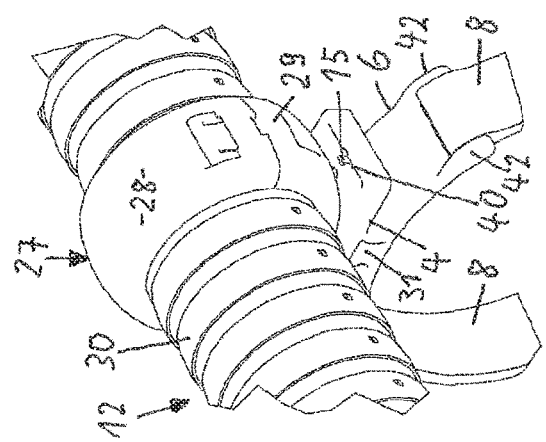
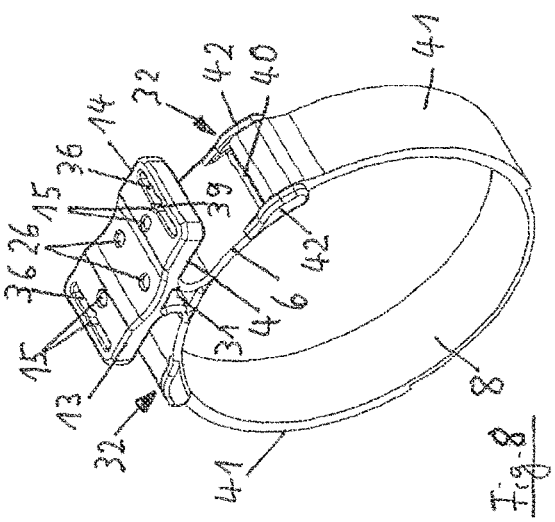
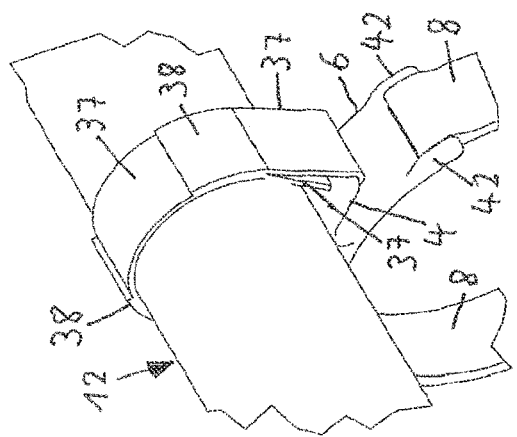

FASTENING PART

FIELD

The invention concerns a fastening part for fastening an energy guide to a component.

In particular the fastening part is intended to serve for fastening hose-like energy guides and tubular energy guide chains to a component.

The components can be of any cross-section, for example a circular, square or rectangular cross-section. The components being considered are in particular robot arms, for example arms of collaborative robots (cobots), but also for example desk legs, shelf supports or framework structures, for example for fastening an energy guide chain leading to lamps or other energy consumers.

BACKGROUND

For fastening an energy guide to a component it is known to use a holder, for example in the form of a clamp, a hook-and-loop fastener band or a cable binder as well as a holder for the energy guide, for example also in the form of a clamp, a hook-and-loop fastener or cable binder, wherein both holders are fastened to each other rigidly or rotatably relative to each other. In general such fastenings are relatively complex in their structure and handling upon fitting to or removal from the energy guide and the component.

SUMMARY

The object of the invention is to structurally simplify the fastening of an energy guide to a component and to make it more universal for use for components of different diameter and energy guides of differing configuration. Further aims of the invention are to provide a compact unitary design with almost no troublesome edges for a lower level of risk of injury, as well as a slender light configuration for the fastening. The aim is to provide that assembly and retrofitting is to be effected in few manual operations.

That subject-matter can be summarized to the effect that there is provided a fastening part for fastening an energy guide to a component, the fastening part comprising a foot web which can be arranged on a component extending in the peripheral direction thereof, wherein in its end regions the foot web has holding means for a first fastening element in strand or band form for fastening the fastening part to the component, and the fastening part has a fastening web which extends in the direction of the foot web and has a plurality of fastening means for fastening a second fastening element of different configuration for fastening an energy guide to the fastening part wherein the foot web and the fastening web are connected together in their central region by way of a connecting element so that side regions of fastening web, that extend beyond the connecting element in the longitudinal direction of the foot web, are arranged at a spacing relative to the foot web, and wherein the side regions have at least some of the fastening means as first fastening means.

The appendant claims recite further configurations of the invention.

The foot web can be in particular in the form of a flexurally elastic web which by virtue of its flexural elasticity can be adapted to the cross-section of the component in the region of its fastening. Preferably in the form of the flexurally elastic web, it can be designed in a pre-curved, straight or angled design configuration in order to simplify fastening thereof on curved or flat components or an outer corner of a component.

The foot web, the fastening web and the connecting element connecting same can be produced at least predominantly from plastic so that they are simple to manufacture. In particular they can be produced in the form of plastic injection moldings.

In particular the fastening web can be formed in one piece on the foot web by way of the connecting element, wherein the fastening web, the foot web and the element connecting same are in the form of a double-T-shaped one-piece part. The double-T-shaped one-piece part can be produced in the form of a plastic injection molding.

On the other hand, the connecting element can also be of such a configuration that it permits a relative rotary movement between the foot web and the fastening web.

In a third configuration the connecting element can be such that it permits a relative swing movement in three dimensions between the foot web and the fastening web.

The first fastening means can be of such an arrangement and configuration that they permit the fastening of second fastening elements for the energy guide of differing extents along the side regions of the fastening web.

The first fastening means can have openings for the engagement in particular of self-tapping screws, wherein the openings are arranged spaced from each other in the longitudinal direction of the fastening web.

The regions of the free ends of the side regions of the fastening web can have constrictions for anchoring an annular elastic strand or band passed around the energy guide. The constriction can be of an arcuate configuration at the sides facing transversely to the longitudinal direction of the fastening web and at the underside of the fastening web, that faces towards the foot web. The contour of the constrictions can be adapted to the outside contour of the annular elastic strand or band to be used.

The central region of the fastening web at which the connecting element is arranged can have second fastening means for fastening the second fastening element provided for the energy guide.

The second fastening means can be in the form of openings for engagement in particular of self-tapping screws, wherein the openings are arranged spaced in the transverse direction relative to the longitudinal direction of the fastening web.

In the case of an integral connection of the foot web to the fastening web the connecting element, at its side facing transversely relative to the longitudinal direction of the foot web, can have recesses, in the opposite regions of which the openings of the second fastening means are arranged.

Alternatively or additionally to the constrictions provided in the region of the free ends of the side regions of the fastening web, that extend at a spacing over the foot web, slots extending transversely to the longitudinal direction of the fastening web can be provided in the region of the free ends for passing through a second fastening element in the form of a band for the energy guide. The slots can have mutually opposite enlargements facing in the longitudinal direction of the fastening part and which form openings belonging to the first fastening means.

The openings of the second fastening means, provided in the central region of the fastening web, can serve for fastening a wear ring (protector). The wear ring comprises two ring halves and a connecting means for connecting the two ring halves to form a ring, in particular using snap-action or latching closures. The two ring halves are arranged in mutually superposed relationship on the fastening web. Firstly the lower ring half is mounted to the fastening web prior to insertion of the energy guide in hose form or the tubular energy guide chain from the interior with preferably self-tapping screws. For that purpose bores adapted to the position of the openings of the second fastening means are provided in the lower ring half. After insertion of the energy guide in hose form or the tubular energy guide chain the upper ring half is fixed to the lower ring half by known snap-action or latching closures.

The openings provided in the fastening web as the first fastening means serve for mounting of a second fastening element in the form of a clamp on the fastening web, wherein the clamp has a substantially flat fastening surface extending in the longitudinal direction of the fastening element further than the fastening surface of the wear ring. Here too the clamp comprises two halves preferably made from plastic, which are arranged in mutually superposed relationship and preferably comprise plastic. The two halves are connected together pivotably in one of the lateral connecting regions so that they can be pivoted open for insertion of the energy guide and closed to retain the energy guide. Preferably a snap-action, clamping or latching closure serves as the closure on the side opposite the pivotal connection.

For mounting such a clamp on the fastening web, bores adapted to the positions of the openings of the first fastening means are formed in the bottom wall of the lower half of the clamp, in a pivoted-open position of the upper half and prior to insertion of the energy guide. Preferably self-tapping screws are passed through the bores and introduced into one or more openings in the first fixing means in the side regions of the fastening web.

It is possible to proceed equally with a clamp serving as a connection element for clamping an end region of an energy guide.

A fastening part according to the invention with an above-described second fastening element for fastening an energy guide to the fastening part is also subject-matter of the present invention.

As an alternative to the above-described annular elastic strand or band a hook-and-loop fastener can serve as the first fastening element. The two end regions of the hook-and-loop fastener are drawn from the inside to the outside through the slots in the flexurally elastic web, that extend transversely to the longitudinal direction, and then in the respective peripheral direction over the hook-and-loop fastener which is laid around the component so that the hook-and-loop fastener regions are in opposite relationship. The hook-and-loop fastener can thus be easily passed around the component and pulled tight. With a suitable length for the hook-and-loop fastener the hook-and-loop fastener holder can easily be adapted to different component diameters which are in a preferred range of between 50 and 150 mm Excess ends can be removed by cutting to length.

The hook-and-loop fastener can be gummed for elastically bearing against the component. Preferably it is coated to make it non-slip at the side directed towards the component.

Instead of the hook-and-loop fastener it is also possible to use a strap, in particular in the form of a webbing strap, preferably with a rubberization woven therein.

The fastening part according to the invention with the above-described fastening element for fastening the fastening part to a component and/or with the above-described second fastening element for fastening the fastening part to an energy guide are also subject-matter of the present invention.

BRIEF DESCRIPTION OF THE DRAWINGS

A number of embodiments by way of example of the invention are illustrated in the drawing in which:

FIG. 1 shows a perspective view of a fastening part with a first fastening element arranged thereon in the form of an annular elastic band, FIG. 2 shows an end view of the fastening part shown in FIG. 1 with a first fastening element, FIG. 3 shows a side view of the fastening part shown in FIG. 1 with a first fastening element, FIG. 4 shows a view of part of the fastening part shown in FIG. 1 and the first fastening element and a second fastening element holding an energy guide in hose form, FIG. 5 shows a view of part of the fastening part shown in FIG. 1 and the first fastening element and a second configuration of a second fastening element in the form of a protector, holding the tubular energy guide chain, FIG. 6 shows a view of part of the fastening part shown in FIG. 1 and the first fastening element and a third configuration of a second fastening element in the form of an intermediate connection in the form of a clamp for a tubular energy guide chain, FIG. 7 shows a view of part of the fastening part shown in FIG. 1 and the first fastening element and a fourth configuration of a second fastening element in the form of a connecting element in the form of a clamp for a tubular energy guide chain, FIG. 8 shows a perspective view of an alternative embodiment for the fastening part and a first fastening element arranged thereon, FIG. 9 shows an end view of the fastening part shown in FIG. 8 and the first fastening element, FIG. 10 shows a side view of the fastening part shown in FIG. 8 and the first fastening element, FIG. 11 shows a view of part of the fastening part shown in FIG. 8 and the first fastening element with a second fastening element in the form of a hook-and-loop fastener for a energy guide in the form of a hose, FIG. 12 shows a view of part of the fastening part shown in FIG. 8 and the first fastening element with a second configuration of the second fastening element in the form of a protector holding a tubular energy guide chain, FIG. 13 shows a view of part of the fastening part shown in FIG. 8 and the first fastening element with a third configuration of the second fastening element in the form of a clamp for intermediate connection of a tubular energy guide chain, and FIG. 14 shows a view of part of the fastening part shown in FIG. 8 and the first fastening element with a fourth configuration of a second fastening element in the form of a connecting element for a tubular energy guide chain.

DETAILED DESCRIPTION

In the embodiments shown by way of example in FIGS. 1 and 8 the fastening parts 1 and 2 respectively are in the form of double-T-shaped integral parts produced in the form of plastic injection moldings. The upper T-limb forms the fastening web 3 and 4 respectively for fastening a second fastening element of differing configuration for an energy guide to be held to a robot arm. The lower T-limb forms the foot web or base web which in the embodiments being considered is in the form of a flexurally elastic web 5 and 6 respectively and serves for fastening a first fastening element 7 and 8 for fastening the fastening part 1 and 2 respectively to a robot arm as the component. The respective flexurally elastic web 5 and 6 is integrally connected to the associated fastening web 3 and 4 respectively by way of a connecting element 9.

In the embodiment shown in FIG. 1 the regions of the free ends of the fastening web have two constrictions 10 for being encircled with an annular elastic strand 11 which is passed around the energy guide, as the second fastening element which can be tightened around an energy guide 12. In the illustrated embodiment the strand 11 is in the form of a rubber ring.

As can also be seen from the embodiment shown in FIG. 1 the fastening web 3 has side regions 13, 14 which extend beyond the connecting element 9 in its direction and which are arranged at a spacing relative to the flexurally elastic web 5 and respectively have two openings 15 spaced in the longitudinal direction for fastening other configurations of the second fastening element for the energy guide. The openings 15 can serve for fastening a clamp 16 for holding the energy guide, as the second fastening element, as shown in FIG. 6, wherein the clamp 16 has a substantially flat fastening surface extending in the longitudinal direction of the fastening web 3. The clamp 16 comprises two halves 17 and 18 which are made from plastic and are arranged in mutually superposed relationship. The two halves 17 and 18 are connected together pivotably in one of the lateral connecting regions so that they can be pivoted open for insertion of the energy guide and closed to hold it. A snap-action closure serves as a closure on the side opposite to the pivotal connection 19.

For fitting the clamp 16 on the fastening web 3 bores adapted to the positions of the openings 15 are produced in the bottom wall of the lower half 18 of the clamp in the pivoted-open position of the upper half 17, and prior to insertion of the energy guide. Self-tapping screws are passed through the bores and into one or more openings 15 in each side region 13, 14 of the fastening web 3.

The same procedure can be carried out with a clamp 20 serving as a connecting element, as a second fastening element for clamping an end region of an energy guide, as shown in FIG. 7. In FIG. 7 the clamp 20 serving as the connecting element is oriented in such a way that the latching closure 21 opposite the pivotal connection 19 can be seen between the upper half 22 and the lower half 23.

The clamp 20 is provided at the side facing away from the energy guide chain, around its central opening 24, with tensile strain-relief elements 25 for the connection of the lines guided through the energy guide chain.

As can further be seen from FIG. 1 provided in the central region of the fastening web 3 are two openings 27 arranged in mutually spaced relationship in the transverse direction with respect to the longitudinal direction of the fastening web 3. The two openings 26 serve for fastening the wear ring (protector) 27 shown in FIG. 5 as the second fastening element for the energy guide. Like the clamps 16 and 20 shown in FIGS. 6 and 7 the wear ring 27 comprises two ring halves 28 and 29 arranged in mutually superposed relationship on the fastening web 3. In their two oppositely disposed connecting regions the two ring halves 28 and 29 are fastened together by a respective snap-action closure. The outside contour of the wear ring 27 is also convexly curved in the longitudinal direction so that there is a very low risk of injury as there are virtually no troublesome or cutting edges.

The energy guides shown in FIGS. 5 through 7 are in the form of a tubular energy guide chain 30.

At its sides facing transversely with respect to the longitudinal direction of the fastening web 3 the connecting element 9 has recesses 31 with an interposed bar, acting as material recesses. The two openings 26 are arranged in the regions of the fastening web, that are above the recesses 31.

As can be seen from FIG. 1 the flexurally elastic web 5 in the end regions thereof has holding means 32 for the first fastening element which is in the form of an annular elastic strand 7. The holding means 32 are in the form of hook-shaped projections which are angled outwardly and towards the connecting element 9. In a plane extending parallel to the flexurally elastic web 5 the projections 33 have a contact surface extending in an arc for the annular elastic strand which can be passed therearound, over which the angled ends 34 of the hook-shaped projections 33 extend. The hook-shaped projections 33 are formed in one piece on the fastening part 1.

The outside contour of the angled ends 34 of the hook-shaped projections 33 extends arcuately with an incision 35 which extends in aligned relationship with the contact surface for the annular elastic strand and into which a tool can engage from the outside for the purposes of releasing the elastic strand which is under tension where it is guided around the contact surface from its anchored state.

In the embodiment shown in FIG. 8 the fastening web 4 in the region of its free ends has slots 36 extending transversely to its longitudinal direction for passing therethrough a hook-and-loop fastener 37 as a holder for the hose-like or tubular energy guide 12. The two end regions 38 of the hook-and-loop fastener are passed from the exterior inwardly on to the flexurally elastic element 6 through the slots 36 in the fastening web, that extend transversely to the longitudinal direction, then deflected over the ends of the fastening web 4 and placed from the exterior in the respective peripheral direction over the hook-and-loop fastener which is drawn around the energy guide 12 and fastened thereto with the hook-and-loop closure regions 39, as shown in FIG. 11.

In their center the slots 36 are provided with enlargements 39 which face in the longitudinal direction of the fastening part 4 and which, together with openings 15 spaced in the longitudinal direction of the fastening web 4, serve for fastening the clamps 16 and 20 respectively shown in FIGS. 13 and 14 as holders for a tubular energy guide chain 30.

Mounting of the clamps 16 and 20 to the fastening web 4 is effected by the method described hereinbefore with reference to FIGS. 6 and 7.

As can also be seen from FIG. 8 the fastening web 4, in its central region, as in the embodiment shown in FIG. 1, has two openings 26 which are spaced in the transverse direction and which serve for fastening a wear ring (protector) 27 shown in FIG. 12.

Mounting of the wear ring 27 to the energy guide chain 30 is effected as described hereinbefore with reference to FIG. 5 of the first embodiment of the fastening web 3.

For fastening the first fastening element 8 which is shown in FIGS. 8 through 10 and which is in the form of a hook-and-loop fastener, the web 6 in the region of its free ends has slots 40 which extend transversely to the longitudinal direction of the flexurally elastic web 4 and through which the hook-and-loop fastener extends. The two end regions 41 of the hook-and-loop fastener which is placed around the robot arm (not shown) are guided from the inside through the slots 40 outwardly, deflected in the respective peripheral direction around holding webs provided between the slots 40 and the free ends of the flexurally elastic web that are adjacent thereto, drawn over the hook-and-loop fastener placed around the robot arm and fastened thereto by hook-and-loop fastener regions.

Outwardly projecting lateral guide webs 42 for the hook-and-loop fastener are arranged at the sides of the slots 40 and holding webs, arranged transversely relative to the longitudinal direction of the flexurally elastic web 6. The guide webs are formed in one piece on the flexurally elastic web 6.

LIST OF REFERENCES

1 fastening part
2 fastening part
3 fastening web
4 fastening web
5 flexurally elastic web
6 flexurally elastic web
7 first fastening element
8 first fastening element
9 connecting element
10 constriction
11 annular elastic strand
12 energy guide
13 side region
14 side region
15 opening
16 clamp
17 upper half
18 lower half
19 pivotal connection
20 clamp
21 latching closure
22 upper half
23 lower half
24 central opening
25 tensile stress-relief element
26 opening
27 wear ring
28 ring half
29 ring half
30 energy guide chain
31 recess
32 holding means
33 hook-shaped projection
34 angled end
35 incision
36 slot
37 hook-and-loop fastener
38 end region
39 enlargement
40 slot
41 end region
42 guide web

What is claimed is:

1. A fastening part for fastening an energy guide to a component, the fastening part comprising:
a foot web in a form of a flexurally elastic web which extends in a longitudinal direction and, due to its flexural elasticity, is adaptable to a cross-section of the component in a region of fastening, and which in its end regions has holding means for a first fastening element in strand or band form for fastening the fastening part to the component, and the fastening part has a fastening web which extends in the direction of the foot web and has a plurality of fastening means for fastening a second fastening element of different configuration for fastening an energy guide to the fastening part,
wherein the foot web and the fastening web are connected together in their central region by way of a connecting element, wherein the fastening web, the connecting element and the foot web are in a form of a double-T-shaped one-piece part in a form of injection molded plastic so that side regions of the fastening web, that extend beyond the connecting element in the longitudinal direction of the foot web, are arranged at a spacing relative to the foot web, and
wherein the side regions have at least some of the fastening means as first fastening means.

2. The fastening part as set forth in claim 1, wherein the connecting element is of such a configuration that it permits a relative rotary movement between the foot web and the fastening web.

3. The fastening part as set forth in claim 1, wherein the first fastening means are of such an arrangement and configuration that they permit the fastening of second fastening elements of differing extents along the side regions of the fastening web.

4. The fastening part as set forth in claim 3, wherein the first fastening means have openings for the engagement in particular of self-tapping screws, wherein the openings are arranged spaced in the longitudinal direction of the fastening web.

5. The fastening part as set forth in claim 3, wherein the regions of the free ends of the side regions of the fastening web have constrictions for anchoring an annular elastic strand or band passed around the energy guide.

6. The fastening part as set forth in claim 3, wherein the central region of the fastening web to which the connecting element is formed has second fastening means.

7. The fastening part as set forth in claim 6, wherein the second fastening means have openings for the engagement in particular of self-tapping screws, which are arranged spaced in the transverse direction with respect to the longitudinal direction of the fastening web.

8. The fastening part as set forth in claim 7, wherein in the case of an integral connection of the foot web to the fastening web the connecting element at its sides arranged transversely relative to the longitudinal direction of the foot web has recesses, in the opposite regions of which the openings of the second fastening means are arranged.

9. The fastening part as set forth in claim 1, wherein the holding means have hook-shaped projections angled outwardly in the end regions of the foot web and towards the connecting element for anchoring an elastic annular strand or band passed around the component as the first fastening means.

10. The fastening part as set forth in claim 9, wherein the hook-shaped projections in a plane extending parallel to the foot web have a contact surface extending in an arc for the elastic annular strand or the band that can be passed around same and over which the angled ends of the hook-shaped projections extend.

11. The fastening part as set forth in claim 10, wherein the contour of the contact surface is adapted to the peripheral contour of the elastic annular strand or band.

12. The fastening part as set forth in claim 1, wherein the holding means have slots extending in the end regions of the foot web transversely to the longitudinal direction of the foot web for passing through a first fastening element in the form of a band and for the deflection thereof around holding webs provided between the slots and the free ends of the foot web, that are adjacent thereto.

13. The fastening part as set forth in claim 12, wherein the band is in the form of a hook-and-loop fastener.

14. The fastening part as set forth in claim 12, wherein arranged at the sides of the slots and holding webs, that are arranged transversely to the longitudinal direction of the foot web, are outwardly projecting lateral guide webs for the elastic band.

15. The fastening part as set forth in claim 1, wherein provided in the end regions of the fastening web are slots extending transversely to its longitudinal direction for passing through a band placed around an energy guide as the second fastening element and for the deflection thereof about holding webs provided between the slots and the free ends of the fastening web, that are adjacent thereto.

16. The fastening part as set forth in claim 15, wherein the band is in the form of a hook-and-loop fastener band.

17. The fastening part as set forth in claim 15, wherein the slots are provided with enlargements which are in opposite relationship in the longitudinal direction of the fastening part and which form openings belonging to the first fastening means.

\* \* \* \* \*